(12) United States Patent
Tseng et al.

(10) Patent No.: US 7,270,420 B2
(45) Date of Patent: Sep. 18, 2007

(54) OPTICAL SCANNER

(75) Inventors: Jen-Shou Tseng, Miao-Li Hsien (TW); Shih-Zheng Kuo, Taipei Hsien (TW); Chang-Lun Chiang, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 64 days.

(21) Appl. No.: 10/605,652

(22) Filed: Oct. 15, 2003

(65) Prior Publication Data

US 2004/0108380 A1 Jun. 10, 2004

(30) Foreign Application Priority Data

Dec. 10, 2002 (TW) ............................... 91219954 U

(51) Int. Cl.
*G03B 21/08* (2006.01)
*H04N 1/23* (2006.01)
*G09B 5/02* (2006.01)

(52) U.S. Cl. .................. 353/63; 358/300; 434/314

(58) Field of Classification Search ............ 353/63–68, 353/DIG. 3, DIG. 4, 5, 11, 29; 358/471–476, 358/496–498, 300, 296; 359/379–381, 201–203; 348/14.08, 14.09, 14.1, 14.04, 206, 211.12, 348/262–264, 267; 434/309–310, 314; *G03B 21/08; G09B 5/02*
See application file for complete search history.

(56) References Cited

U.S. PATENT DOCUMENTS 4,406,530 A * 9/1983 Hasegawa et al. ............ 353/66
5,325,137 A * 6/1994 Konno et al. ................ 353/63
5,414,481 A * 5/1995 Fujioka et al. .............. 353/122
5,548,358 A * 8/1996 Takahashi ................... 353/122
5,947,577 A * 9/1999 Jikihara et al. ............... 353/97
2002/0024638 A1* 2/2002 Hidari et al. ................. 353/63
2002/0191232 A1* 12/2002 Orozco ....................... 358/506
2004/0095614 A1* 5/2004 Stocker ....................... 358/451

FOREIGN PATENT DOCUMENTS

EP 0550038 A1 * 7/1993
JP 06-148744 * 5/1994

* cited by examiner

*Primary Examiner*—Andrew T. Sever
(74) *Attorney, Agent, or Firm*—Marger Johnson & McCollom, P.C.

(57) ABSTRACT

An optical scanner suitable for scanning a vertical object. The optical scanner has a scanning body, a focusing device and a scanning module. The scanning body has a transparent window, the focusing device has an arm, a reflective mirror and a lens. One end of the arm is coupled to the scanning body, and the reflecting mirror and the lens are disposed on the arm. The scanning module is disposed in the scanning body with a shell, a lens and an optical sensor. The shell has a light cone opening, and the lens and optical sensor are disposed within the shell. The image of the vertical object is focused by the focusing device on the transparent window, incident to the scanning module via the light cone opening, and refracted by the lens to form an image on the optical sensor.

36 Claims, 6 Drawing Sheets

OPTICAL SCANNER

CROSS REFERENCE TO RELATED APPLICATIONS

This application claims the priority benefit of Taiwan application Ser. No. 91219954, filed Dec. 10, 2002.

BACKGROUND OF INVENTION

1. Field of the Invention

The invention relates in general to an optical scanner having the power source module, and more particularly, to an optical scanner suitable for scanning a vertical object.

2. Related Art of the Invention

The blackboard or whiteboard are commonly equipped in a meeting room or a classroom for the presenter to use chalk, marker or pen for making or drawing notes. Before making new notes, the presenter has to erase the notes written on the board first, such that the written notes cannot be stored for reference. Currently, an electronic whiteboard has been developed allowing the written notes to be copied and stored on a thermo-pressed paper.

However, such electronic white board is very expensive and difficult to carry. In addition, the paper storage form has a shorter preserving time and is easily damaged. Further, when a large amount of data is stored, a large quantity of paper is required.

SUMMARY OF INVENTION

The present invention provides an optical scanner suitable for scanning a vertical object. The data of the vertical object is stored as an optical image. Therefore, the optical scanner is portable, low-cost and suitable for application in any situation.

In addition to scanning a vertical object, the optical scanner provided by the present invention can also scan a horizontal object.

The optical scanner provided by the present invention can also be used to scan a horizontal object in addition to the vertical object. Further, the optical scanner can also be used as a projector.

The optical scanner provided by the present invention comprises a scanning body, a focusing device and a scanning module. The scanning body has a top surface with a transparent window. The focusing device includes an arm, a reflective mirror and a lens. One end of the arm is coupled to the scanning body, and the reflective mirror and the lens are disposed on the arm. The lens is located in a reflecting path of the reflective mirror. The scanning module is located in the scanning body and comprises a shell, a lens and an optical sensor. The shell has a light cone opening, and the lens and the optical sensor are disposed within the shell. The optical sensor is located on the optical path following the lens. The imaging light of the vertical object is reflected to the lens by the reflective mirror, refracted by the lens to the transparent window, incident on the scanning module through the light cone opening, and refracted by the lens of the scanning module to form an image on the optical sensor. The optical scanner further comprises a fine tuning device disposed on the arm to reduce the height of the arm, so as to adjust the focal length of the lens.

The above optical scanner is operative to scan a vertical object and a horizontal object. A lid is pivotally connected to the scanning body. The used to cover the transparent window, while the transparent window allows a horizontal object disposed thereon. The shell of the scanning module further comprises a light source incident on a surface of the horizontal object to generate an imaging light. The imaging light entering the scanning module through the light cone opening is refracted by the lens of the scanning module to form an image on the optical sensor. In addition, the lens disposed within the shell has dual focal lengths; or alternatively, two lenses with different focal lengths are disposed within the shell for generating two different optical paths for the vertical and horizontal objects. The optical scanner further comprises a reflective mirror set disposed within the shell along the optical path in front of the lens to further shrink the volume of the scanner.

The optical scanner further comprises a projecting lamp source disposed on an internal bottom of the scanning body to achieve the scanning and projection functions. The light generated by the projecting lamp is used to project the light image of the scanning margin to the vertical object as a focusing reference prior to scanning.

BRIEF DESCRIPTION OF DRAWINGS

These, as well as other features of the present invention, will become more apparent upon reference to the following drawings.

DETAILED DESCRIPTION

Figure 1A:
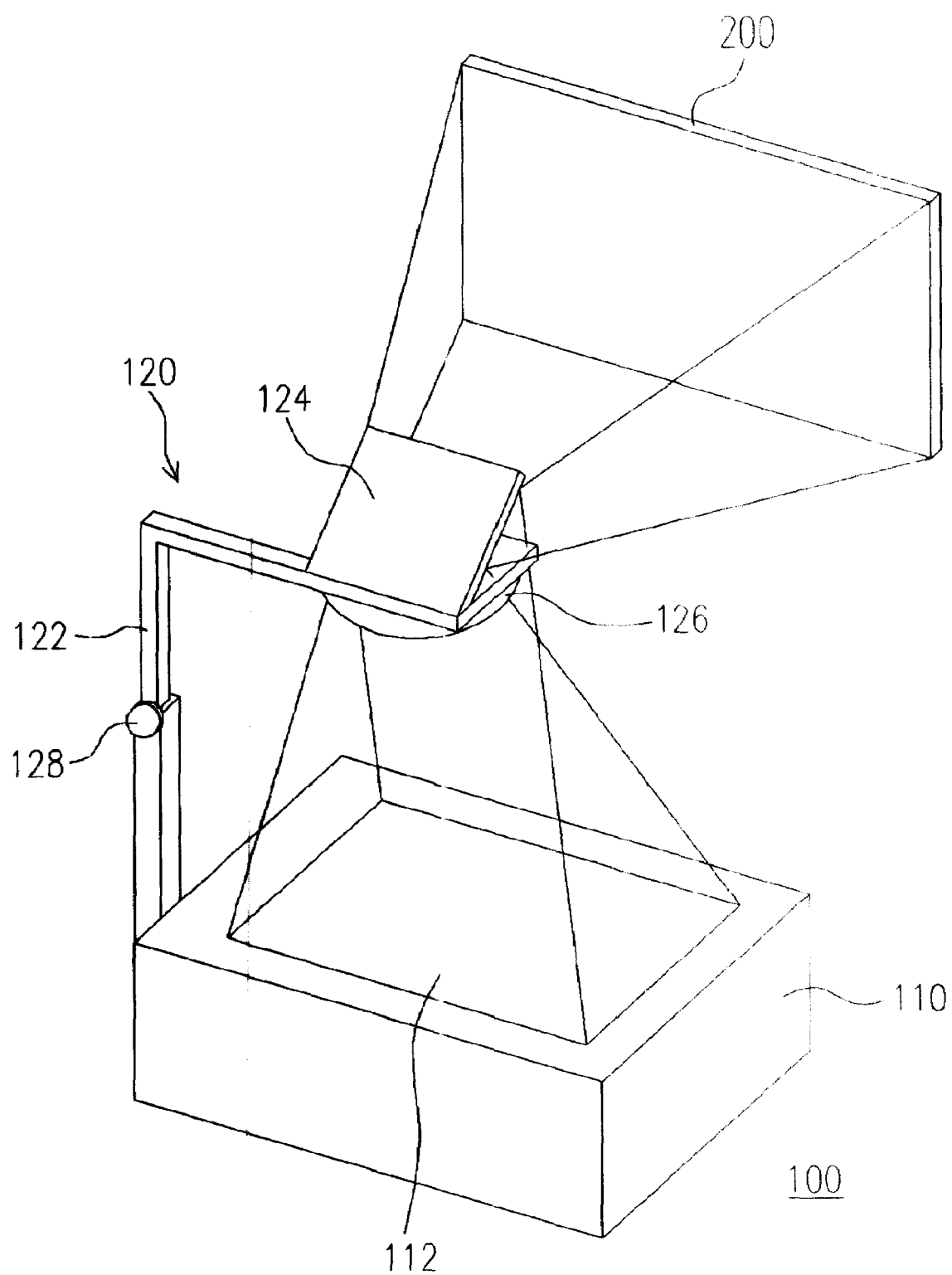
FIG. 1A shows a perspective view of an external structure and a part of scanning path for an optical scanner according to the first embodiment of the present invention.
Figure 1B:
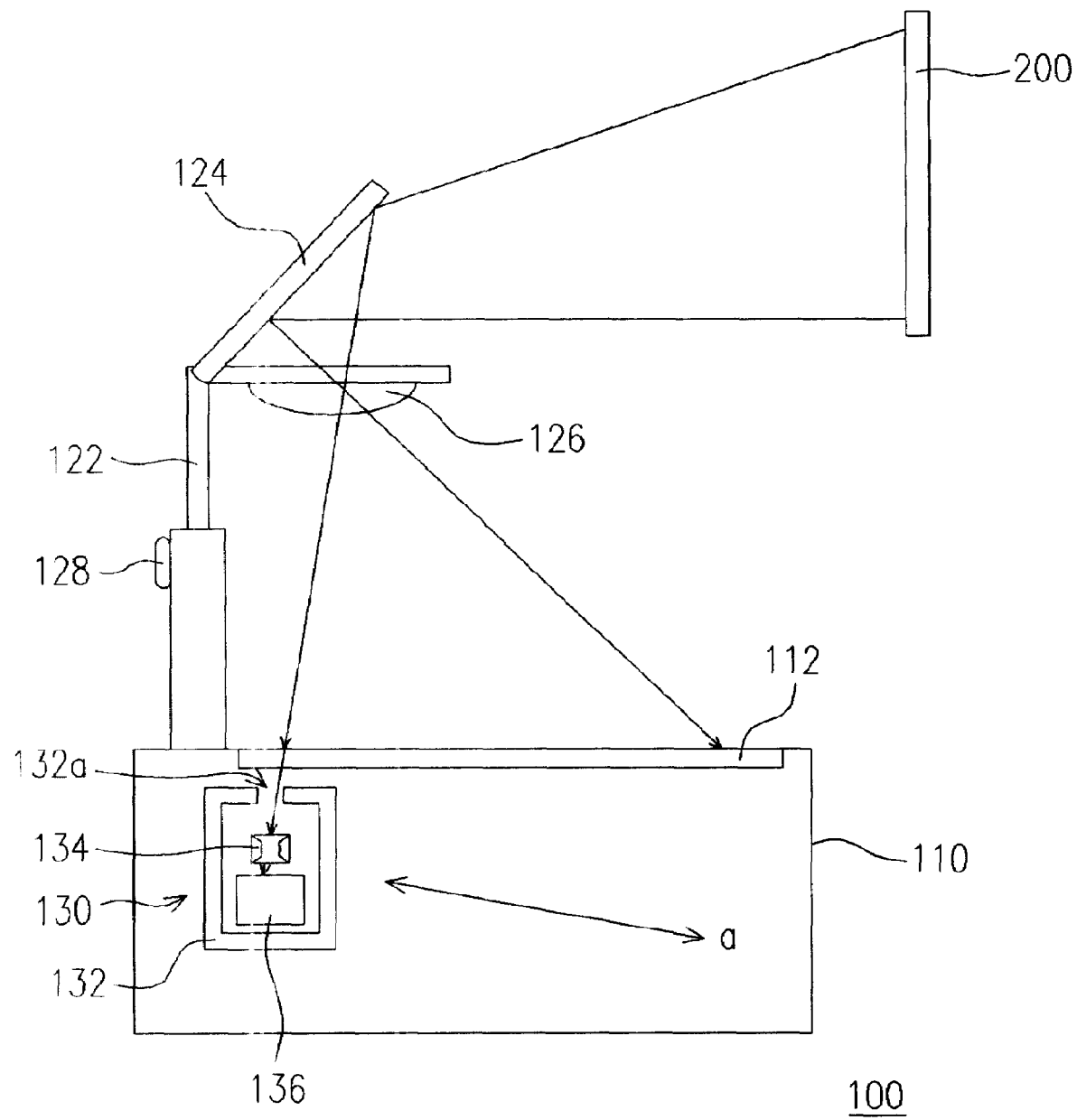
FIG. 1B shows a side view of an internal structure and the scanning path of the optical scanner according to the present invention.

Referring to FIGS. 1A and 1B, FIG. 1A shows a perspective view of an external structure and a part of scanning path in the first embodiment of the present invention, and FIG. 1B is a side view showing an internal structure and the optical path.

The optical scanner 100 as shown in FIGS. 1A and 1B is suitable for use to scan a vertical object 200 such as a blackboard or a whiteboard. The optical scanner 100 comprises a scanning body 110, a focusing device 120 and a scanning module 130. The scanning body 110 is hollow inside with a top surface that comprises a transparent window 112. The focusing device 120 includes an arm 122, a reflective mirror 124 and a lens 126. One end of the arm 122 extends from the scanning body 110. The reflective mirror 124 and the lens 126 are disposed on the arm 122. The lens 126 is located at a reflecting path of the reflective mirror 124. The reflective mirror 124 can be pivotally connected to the arm 122 to extend or retract with a predetermined angle.

Referring to FIG. 1B, the scanning module is located within the scanning body, and guiding mechanism and belt driving device are used to reciprocally move the scanning module 130 underneath the transparent window 112. The scanning module 130 comprises a shell 132, a lens 134 and an optical sensor 136. The shell has a top surface that has a light cone opening 132a, and the lens 134 and the optical sensor 136 are disposed within the shell 132. The optical sensor 136 is located along a scanning path of the lens 134.

When the optical scanner 100 is scanning a vertical object 200, an imaging light is generated by radiating an external light source on the vertical object 200. The reflective mirror 124 reflects the imaging light to the lens 126, which then refracts imaging light to project on the transparent window 112. The imaging light then enters the scanning module by passing through the light cone opening 132a. Being refracted by the lens 134, an image of the imaging light is formed on the optical sensor 136. The optical scanner 100 may further comprises a fine tuning device 128 disposed on the arm 122. The fine tuning 128 device reduces the height of the arm 122 and adjusts the focal length of the lens 126.

The optical scanner 100 can be linked with laptop computer or other portable electronic products, such that the data of the vertical object 200 can be permanently stored as an optical image.

According to the above, as the vertical object normally includes a large area whiteboard or blackboard, when the scanning module 130 is scanning the vertical object 130 longitudinally (from top to bottom) each point or transversely (from left to right), the length of optical path from each point of the object entering the scanning module is different. Thereby, the image of the imaging light may not be resolvably formed on the optical sensor 136. To improve such problem includes installing a fine tuning device 128 or configuring the reflective lens 124 with a curved surface, such that the length of optical path for each point of the vertical object 200 is substantially identical and horizontally received by the scanning module 130. Alternatively, the scanning module 130 may be adjusted. For example, when the scanning module 130 uses longitudinal scanning mode to scan, the moving track of the scanning module 130 can be changed as shown as the arrow a in the figures. When the transverse scanning is adapted, the scanning module 130 is inclined with an angle and displaced along the horizontal scanning direction. Therefore, the length of optical path for each point of the object is the same, and the image can be clearly formed on the optical sensor 136.

Figure 2A:
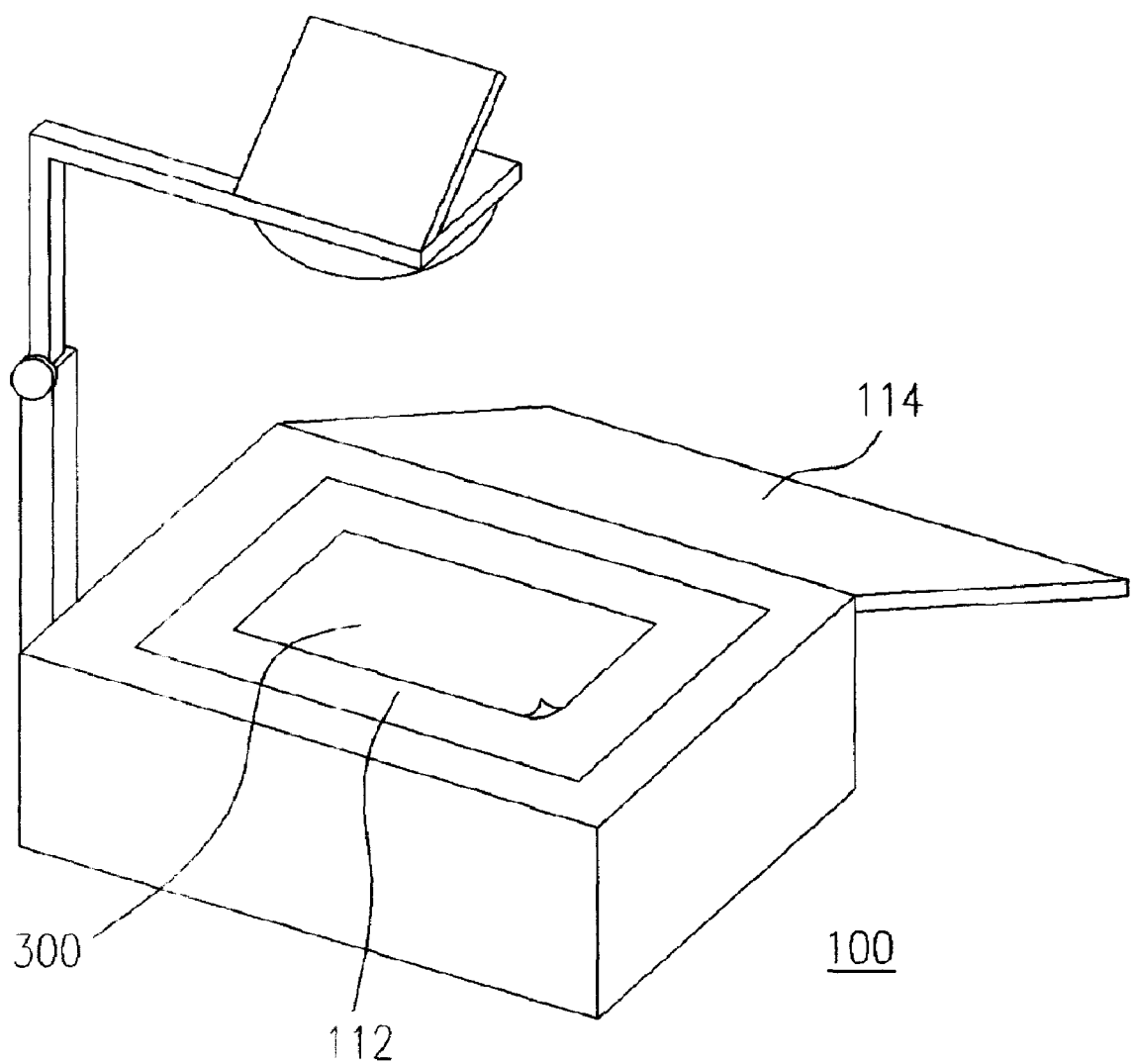
FIG. 2A shows a perspective view of an external structure of an optical scanner in the second embodiment of the present invention.
Figure 2B:
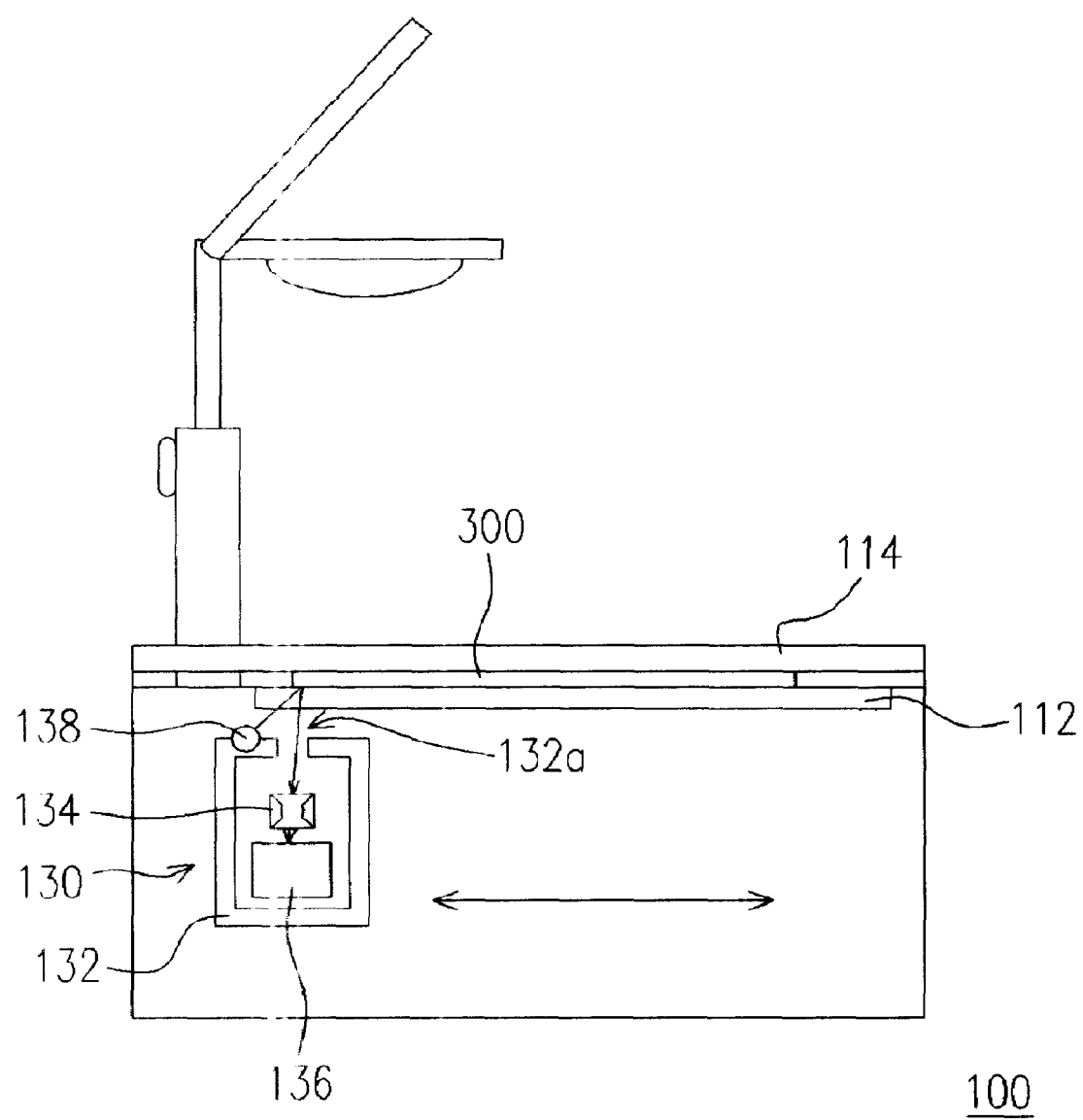
FIG. 2B shows a side view of an internal structure and a scanning path of the optical scanner in the second embodiment of the present invention.

Referring to FIGS. 2A and 2B, FIG. 2A shows a perspective view of an external structure of an optical scanner, and FIG. 2B shows the internal structure and the optical path of the optical scanner.

In the second embodiment as shown in FIGS. 2A and 2B, the optical scanner 100 is suitable for use to scan a vertical object 200 and a horizontal object 300. The structure for scanning the vertical object 200 is similar to that as described in the first embodiment and is not repeated here. The function for scanning the horizontal object 100 is described as follows. To scan the horizontal object 100, a lid 114 is pivotally connected to the scanning body 110 to cover the transparent window 112. The lid 114 can be horizontally disposed on the transparent window 112. A line light source 138 is disposed on the shell 132 of the scanning module 130.

To perform scanning operation on the horizontal object 300, the object 300 is disposed on the transparent window 112 and covered with the lid 114. The line light source 138 radiates on a surface of the object 300 to generate an imaging light traveling through the light cone opening 132a to enter the scanning module 130. The imaging light is then refracted by the 134 to form an image on the optical sensor 136. Only by lifting up the lid 114 can the scanning mode be switched from horizontal to vertical scanning. In addition, as the optical paths for scanning vertical and horizontal objects 200 and 300 are different, a lens with dual focal points is installed within the shell 132 of the scanning module 130. Alternatively, a first lens and a second lens with different focal lengths can be installed in the shell and switched between the vertical and horizontal scanning modes.

According to the above, a reflective mirror lens (not shown) can also be installed in the shell of the scanning module 130 to increase the length of optical length by multiple reflections. Thereby, the volume of the scanner 130 can be further reduced.

Figure 3A:
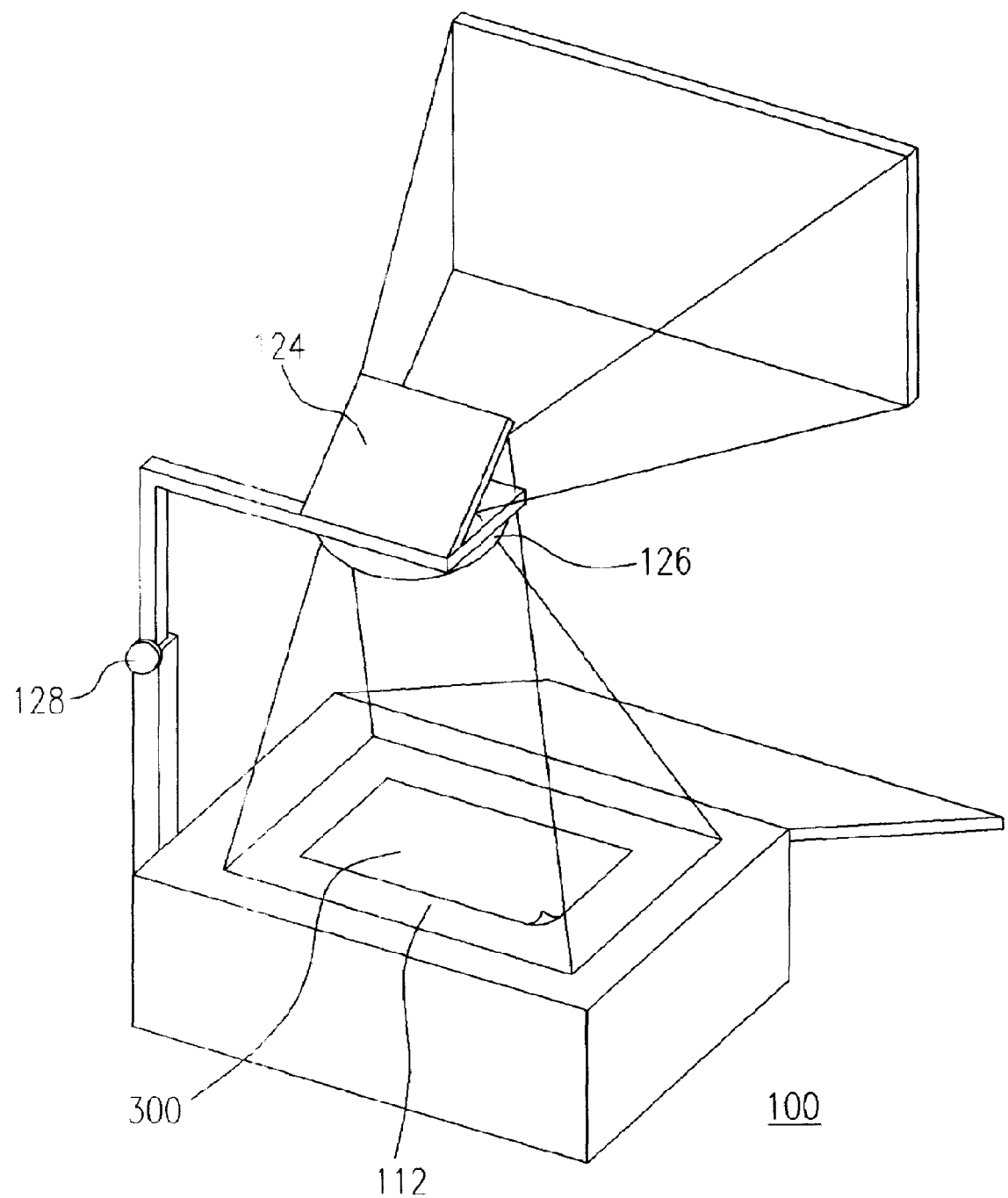
FIG. 3A shows a perspective view of an external structure of an optical scanner in the third embodiment of the present invention.
Figure 3B:
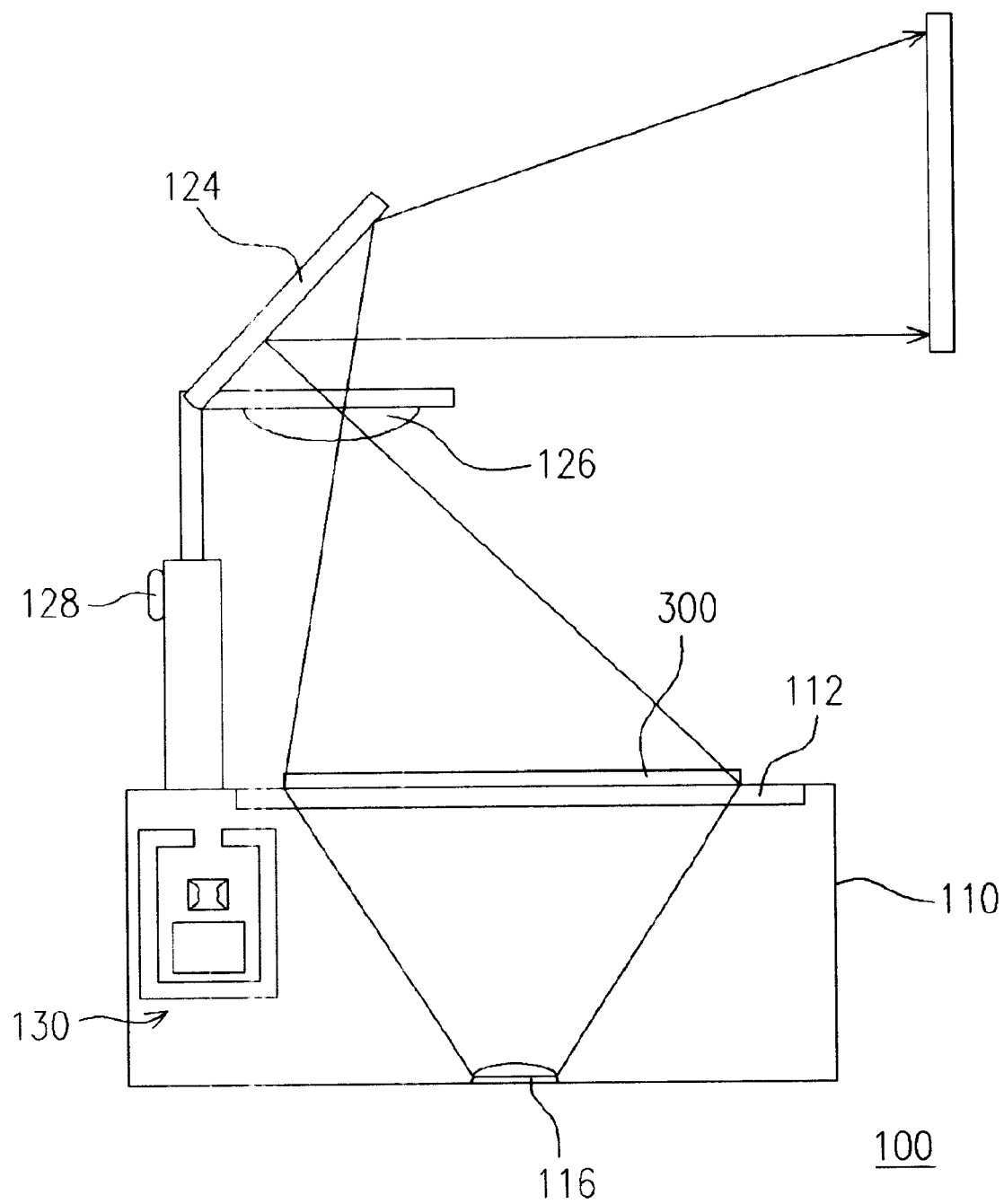
FIG. 3B shows a side view of an internal structure and a scanning path of the optical scanner in the third embodiment of the present invention.

Referring to FIGS. 3A and 3B, FIG. 3A shows a perspective view of an external structure and a part of a projecting part of an optical scanner, and FIG. 3B is a side view showing the internal structure and the projecting part of the optical scanner.

In the third embodiment, in addition to the function of scanning vertical and horizontal objects as described in the first and second embodiments, the optical scanner also has a projection function. A projecting lamp source 116 is disposed at an internal bottom of the scanning body 110. Before activating the projection function, the scanning module 130 is located at an inner edge of the scanning body 110 to avoid blocking a light emitted from the projecting lamp source 116. While performing the projection function, the horizontal object 300 is disposed on the transparent window 112. The horizontal object 300 includes a transparency, for example. The light emitting from the projecting lamp source 116 transmits through the horizontal object 300 to form an imaging light source. The imaging light source is focused on the reflective mirror 124 by the lens 126, and reflected from the reflective mirror 124 to the whiteboard or a white backdrop. It is appreciated that the projecting optical path is inverse to the optical path for scanning the vertical object and can thus be used as a focusing reference thereof. In other words, when the focusing process for the above projecting optical path is performed, the focusing process for the scanning optical path is complete as well. The projecting mode can thus be directly switched to the scanning mode to perform scanning operation on the vertical object.

Accordingly, the optical scanner provided by the present invention has at least the following advantages.

1. The optical scanner is small, portable and low cost which improves the drawbacks for the conventional electronic whiteboard.
2. The optical scanner has both scanning and projecting functions and can be used to scan large area vertical objects.
3. The optical scanner can be linked with portable electronic products such as laptop computer, such that the extracted data of the vertical object can be permanently stored as an image file.

Other embodiments of the invention will appear to those skilled in the art from consideration of the specification and practice of the invention disclosed herein. It is intended that the specification and examples are to be considered as exemplary only, while the true scope and spirit of the invention are indicated by the following claims.

What is claimed is:

1. An optical scanner suitable for scanning a generally vertical object, comprising:
   a scanning body, comprising a transparent window on a top surface thereof;
   a focusing device, including:
      an arm, with one end coupled to the scanning body, a reflective mirror, disposed on the arm, and
a lens, disposed on the arm and located at a reflecting path of the reflective mirror, and wherein the lens is capable of horizontally focusing an image of a generally vertical object through the transparent window, the generally vertical object being disposed at a location remote from the transparent window; and
a scanning module, disposed within the scanning body and capable of reciprocally moving underneath the transparent window, and wherein the scanning module is capable of obtaining an image of the generally vertical object focused by said focusing device, the scanning module comprising:
a shell, comprising a light cone opening capable of receiving an imaging light of the generally vertical object,
a first lens, disposed within the shell, and
an optical sensor, disposed within the shell and located on an optical length following the first lens of the scanning module.

2. The optical scanner according to claim 1, further comprising a fine tuning device disposed on the arm capable of reducing a height of the arm and adjusting a focal length of the lens of the focusing device.

3. The optical scanner according to claim 1, wherein the generally vertical object includes a blackboard.

4. The optical scanner according to claim 1, wherein the generally vertical object includes a whiteboard.

5. The optical scanner according to claim 1, further comprising a projecting lamp source disposed at an internal bottom of the scanning body.

6. The optical scanner according to claim 1, further comprising a reflective mirror set installed in the shell and located along an optical path prior to the first lens of the scanning module.

7. An optical scanner suitable for scanning a generally vertical object and a generally horizontal object, the optical scanner comprising:
a scanning body, comprising a transparent window on a top surface thereof;
a lid, pivotally connected to the scanning body capable of covering the transparent window;
a focusing device, including:
an arm, with one end coupled to the scanning body,
a reflective mirror, disposed on the arm, and
a lens, disposed on the arm and located at a reflecting path of the reflective mirror, and wherein the lens is capable of horizontally focusing an image of a generally vertical object through the transparent window, the generally vertical object being disposed at a location remote from the transparent window; and
a scanning module, disposed within the scanning body and capable of reciprocally moving underneath the transparent window, and wherein the scanning module is capable of obtaining an image of the generally vertical object focused by said focusing device, the scanning module comprising:
a shell, comprising a light cone opening capable of receiving imaging light of the generally vertical object and the generally horizontal object,
a first lens, disposed within the shell, and
an optical sensor, disposed within the shell and located on an optical length following the first lens.

8. The optical scanner according to claim 7, wherein the first lens comprises a lens with dual focal points.

9. The optical scanner according to claim 7, further comprising a second lens with a focal length different from that of the first lens, the first and second lenses are switchable with each other.

10. The optical scanner according to claim 7, further comprising a fine tuning device disposed on the arm capable of reducing the height of the arm and adjusting a focal length of the lens of the focusing device.

11. The optical scanner according to claim 7, wherein the generally vertical object includes a blackboard.

12. The optical scanner according to claim 7, wherein the generally vertical object includes a whiteboard.

13. The optical scanner according to claim 7, further comprising a projecting lamp source disposed at an internal bottom of the scanning body.

14. The optical scanner according to claim 7, further comprising a reflective mirror set installed in the shell and located along an optical path prior to the first lens of the scanning module.

15. A method, comprising:
focusing an image of a first object through a transparent window of an optical scanner, wherein the first object is positioned remote from said transparent window, and wherein the transparent window is capable of supporting a second object thereon; and
scanning the image focused through the transparent window to obtain an image of the first object.

16. The method of claim 15, further comprising linking with an electronic device capable of storing the image obtained at said scanning.

17. The method of claim 15, further comprising illuminating the image with a light emanating from a light source.

18. The method of claim 15, further comprising:
in a first mode, scanning the image focused through the transparent window to obtain the image of the first object; and
in a second mode, focusing an image of a second object through the transparent window of the optical scanner, wherein the second object is positioned adjacent said optical scanner, and scanning the image focused through the transparent window to obtain an image of the second object.

19. The method of claim 18, wherein said first object has a generally vertical orientation and wherein said second object has a generally horizontal orientation.

20. The method of claim 15, further comprising projecting an image from the optical scanner.

21. The method of claim 15, wherein said scanning comprises scanning the image focused through the transparent window to obtain an image of the first object by reciprocally moving underneath the transparent window.

22. An apparatus, comprising:
means for focusing an image of a first object through a transparent window of a scanning body, wherein said first object is positioned remote from said transparent window, and wherein the transparent window is capable of supporting a second object thereon; and
means for scanning the image focused through the transparent window to obtain an image of the first object.

23. The apparatus of claim 22, further comprising means for linking with an electronic device capable of storing the image obtained by said scanning means.

24. The apparatus of claim 22, further comprising means for illuminating the image for scanning.

25. The apparatus of claim 22, further comprising means for scanning a second object positioned adjacent said scanning body.

26. The apparatus of claim 25, wherein said first object has a generally vertical orientation and wherein said second object has a generally horizontal orientation.

27. The apparatus of claim 22, further comprising means for projecting an image.

28. The apparatus of claim 22, wherein said means for scanning comprises means for scanning the image focused through the transparent window to obtain an image of the first object by reciprocally moving underneath the transparent window.

29. An apparatus, comprising:
a scanning body;
a transparent window disposed on a surface of the scanning body wherein the transparent window is capable of supporting a second object thereon;
a scanning module disposed within the scanning body;
a focusing device, wherein the focusing device is capable of focusing an image of an object through the transparent window, the object being disposed at a location remote from the transparent window; and
wherein the scanning module is capable of obtaining an image of the object focused by said focusing device.

30. An apparatus as claimed in claim 29, wherein the image focused by said focusing device is obtained from light reflected off the object from a light source disposed external to the scanning body.

31. An apparatus as claimed in claim 29, wherein the image focused by said focusing device is obtained from light reflected off a second object from a light source disposed internal to the scanning body, the second object being disposed at a location adjacent the scanning body.

32. An apparatus as claimed in claim 31, said scanning module being capable of obtaining an image of the second object when the second object is generally horizontally positioned with respect to the transparent window.

33. An apparatus as claimed in claim 29, wherein the object is at least one of a blackboard or a chalkboard, or a combination thereof.

34. An apparatus as claimed in claim 29, said scanning module being capable of obtaining an image of the object when the object is generally vertically positioned with respect to the transparent window.

35. An apparatus as claimed in claim 29, wherein said scanning module is further capable of obtaining an image of the object focused by said focusing device by reciprocally 36. An apparatus, comprising:
a scanning body;
a transparent window disposed on a surface of the scanning body,
a scanning module disposed within the scanning body; a focusing device, wherein the focusing device is capable of focusing an image of an object through the transparent window, the object being disposed at a location remote from the transparent window;
wherein the scanning module is capable of obtaining an image of the object focused by said focusing device; and
wherein the object is at least one of a blackboard or a chalkboard, or a combination thereof.

* * * * *

UNITED STATES PATENT AND TRADEMARK OFFICE
CERTIFICATE OF CORRECTION

PATENT NO. : 7,270,420 B2                                    Page 1 of 1
APPLICATION NO. : 10/605652
DATED : September 18, 2007
INVENTOR(S) : Tseng et al.

It is certified that error appears in the above-identified patent and that said Letters Patent is hereby corrected as shown below:

At column 8, line 14, please replace "by reciprocally" with --by reciprocally moving underneath the transparent window.--.
At column 8, line 19, please replace "body," with --body;--.

Signed and Sealed this

Eighteenth Day of May, 2010

David J. Kappos
*Director of the United States Patent and Trademark Office*